United States Patent
Abrol et al.

(10) Patent No.: US 6,785,823 B1
(45) Date of Patent: Aug. 31, 2004

(54) METHOD AND APPARATUS FOR AUTHENTICATION IN A WIRELESS TELECOMMUNICATIONS SYSTEM

(75) Inventors: Nischal Abrol, San Diego, CA (US); Marcello Lioy, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/453,612

(22) Filed: Dec. 3, 1999

(51) Int. Cl.[7] ............................. G06F 11/30; H04L 9/00
(52) U.S. Cl. ...................... 713/201; 713/155; 713/168; 380/277
(58) Field of Search ................................. 713/151, 201, 713/155, 168, 170, 171; 380/9, 23, 49, 277, 280, 247, 270

(56) References Cited

U.S. PATENT DOCUMENTS

| | | | |
|---|---|---|---|
| 4,901,307 A | | 2/1990 | Gilhousen et al. ............ 370/320 |
| 5,802,178 A | * | 9/1998 | Holden et al. ................ 713/151 |
| 5,848,161 A | * | 12/1998 | Luneau et al. ................. 705/78 |
| 6,377,691 B1 | * | 4/2002 | Swift et al. .................. 380/277 |

FOREIGN PATENT DOCUMENTS

WO    9845785    10/1998

OTHER PUBLICATIONS

Perkins, Charlie "Mobile IP and Security Issue: An Overview" Proceedings of 1st IEEE–RPS Joint Conference on Internet Technologies and Services, pp. 131–148 (Oct. 25–28, 1999).

* cited by examiner

Primary Examiner—Emmanuel L. Moise
(74) Attorney, Agent, or Firm—Philip R. Wadsworth; Sandip(Micky) S. Minhas; Jae-Hee Choi

(57) ABSTRACT

A method and apparatus for allowing a mobile station in a wireless network to perform network authentication in association with mobile packet data services. The packet data serving node (PDSN) does not authenticate the mobile station with an authentication server prior to sending a CHAP success message. Rather, a mobile station is authenticated via an authentication server after the PDSN receives an IPCP message indicating whether the mobile station desires to use Mobile IP in the current session. If the mobile station desires to use Mobile IP, the PDSN uses authentication techniques in accordance with Mobile IP protocols. In the preferred embodiment, if the mobile station does not desire to use Mobile IP, the PDSN authenticates the mobile station querying an authentication server with the buffered contents of a previously received CHAP challenge response.

33 Claims, 6 Drawing Sheets

US 6,785,823 B1

METHOD AND APPARATUS FOR AUTHENTICATION IN A WIRELESS TELECOMMUNICATIONS SYSTEM

BACKGROUND OF THE INVENTION

I. Field of the Invention

The current invention relates to wireless communications. More particularly, the present invention relates to an improved method and system for performing authentication of a wireless mobile station with a packet data network.

II. Description of the Related Art

With the increasing popularity of both wireless communications and Internet applications, a market has arisen for products and services that combine the two. As a result, various methods and systems are under development to provide wireless Internet services, such as might allow a user of a wireless telephone or terminal to access e-mail, web pages, and other network resources. Because information on the Internet is organized into discrete "packets" of data, these services are often referred to as "packet data services."

Among the different types of wireless communication systems to be used to provide wireless packet data services are code division multiple access (CDMA) systems. The use of CDMA modulation techniques is one of several techniques for facilitating communications in which a large number of system users are present. The framing and transmission of Internet Protocol (IP) data through a CDMA wireless network is well known in the art and has been described in TIA/EIA/IS-707-A, entitled "DATA SERVICE OPTIONS FOR SPREAD SPECTRUM SYSTEMS", hereafter referred to as IS-707.

Other multiple access communication system techniques, such as time division multiple access (TDMA), frequency division multiple access (FDMA) and AM modulation schemes such as amplitude companded single sideband (ACSSB) are known in the art. These techniques have been standardized to facilitate interoperation between equipment manufactured by different companies. Code division multiple access communications systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", hereinafter referred to as IS-95.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission", and hereinafter referred to as cdma2000. A second of these proposals was issued by the European Telecommunications Standards Institute (ETSI), entitled "The ETSI UMTS Terrestrial Radio Access (UTRA) ITU-R RTT Candidate Submission", also known as "wideband CDMA" and hereinafter referred to as W-CDMA. A third proposal was submitted by U.S. TG 8/1 entitled "The UWC-136 Candidate Submission", hereinafter referred to as EDGE. The contents of these submissions are public record and are well known in the art.

Several standards have been developed by the Internet Engineering Task Force (IETF) to facilitate mobile packet data services using the Internet. Mobile IP is one such standard, and was designed to allow a device having an IP address to exchange data with the Internet while physically travelling throughout a network (or networks). Mobile IP is described in detail in IETF request for comments (RFC), entitled 'IP Mobility Support,' and incorporated by reference.

Several other IETF standards set forth techniques referred to in the above named references. Point-to-Point Protocol (PPP) is well known in the art and is described in IETF RFC 1661, entitled "The Point-to-Point Protocol (PPP)" and published in July 1994, hereinafter referred to as PPP. PPP includes a Link Control Protocol (LCP) and several Network Control Protocols (NCP) used for establishing and configuring different network-layer protocols over a PPP link. One such NCP is the Internet Protocol Control Protocol (IPCP), well known in the art and described in IETF RFC 1332 entitled "The PPP Internet Protocol Control Protocol (IPCP)" published in May of 1992, hereinafter referred to hereinafter as IPCP. Extensions to the LCP are well known in the art and described in IETF RFC 1570, entitled "PPP LCP Extensions" published in January 1994, referred to hereinafter as LCP. A method for Authentication using PPP known as Challenge Handshake Authentication Protocol (CHAP) is well known in the art and is described in IETF RFC 1994, entitled "PPP Challenge Handshake Authentication Protocol (CHAP)" and published in August 1996. A standardized method for identifying users and a syntax for the Network Access Identifier (NAI) used during PPP authentication is well known in the art and is described in IETF RFC 2486, entitled "The Network Access Identifier" published in January, 1999. A protocol for carrying authentication, authorization, and configuration information between different network entities known as Remote Authentication Dial In User Service (RADIUS) is described in the IETF RFC 2138 of the same name, published in April 1997, and is also well known in the art. An Authentication, Authorization, and Accounting (AAA) server is a term known in the art, and refers to a server capable of providing Authentication, Authorization, and Accounting services. A RADIUS server is a type of AAA server.

As discussed above, there is a desire in the art for providing access to the Internet from wireless mobile devices. Existing authentication methods are thus far insufficient for providing authentication for a diverse set of mobile stations in a wireless network. There is therefore a need in the art to develop a method for performing authentication between a mobile station using packet data services and authentication servers in the network.

SUMMARY OF THE INVENTION

The present invention provides a method and apparatus for allowing a mobile station in a wireless network to perform network authentication in association with mobile packet data services. A packet data serving node (PDSN) supports authentication by buffering the contents of a CHAP challenge response message, and subsequently generating a CHAP success message based solely on the contents of the received CHAP challenge response message. The PDSN does not authenticate the mobile station with an authentication server prior to sending the CHAP success message. Rather, a mobile station is authenticated via an authentication server after the PDSN receives an IPCP message indicating whether or not the mobile station desires to use Mobile IP in the current session. If the mobile station desires to use Mobile IP, the PDSN uses authentication techniques in accordance with Mobile IP protocols. In the preferred embodiment, if the mobile station does not desire to use Mobile IP, the PDSN authenticates the mobile station querying an authentication server with the buffered contents of the aforementioned CHAP challenge response.

The methods and techniques disclosed herein may be used in junction with several alternate modulation techniques, including TDMA, cdma2000, WCDMA, and EDGE without departing from the present invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
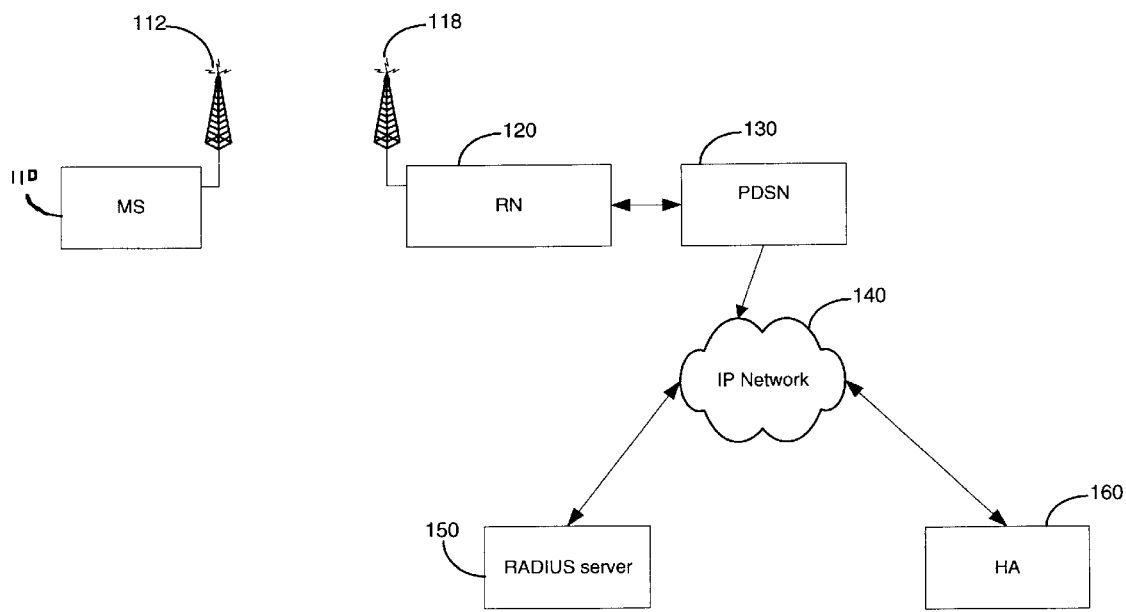
FIG. 1 is a high-level block diagram of a wireless communications system for performing packet data networking.

FIG. 1 is a high-level block diagram of a wireless communications system for performing packet data networking. Mobile Station (MS) 110 is a mobile station capable of performing one or more wireless packet data protocols. In the preferred embodiment, MS 110 is a wireless telephone running an IP-based Web-browser application. In the preferred embodiment, MS 110 is not connected to any external device, such as a laptop. In an alternative embodiment, MS 110 is a wireless telephone that is connected to an external device, wherein a protocol option is used that is equivalent to the Network Layer $R_m$ Interface Protocol Option described in IS-707. In another alternative embodiment, MS 110 is a wireless telephone that is connected to an external device, wherein a protocol option is used that is equivalent to the Relay Layer $R_m$ Interface Protocol Option described in the aforementioned IS-707.

In the preferred embodiment, MS 110 communicates with Internet Protocol (IP) network 140 via wireless communications with radio network (RN) 120. MS 110 generates IP packets for IP network 140 and encapsulates them into frames destined for Packet Data Serving Node (PDSN) 130. In the preferred embodiment, the IP packets are encapsulated using PPP and the resultant PPP byte stream transmitted through a CDMA network using a Radio Link Protocol (RLP).

MS 110 sends the frames to RN 120 by modulating and transmitting them through antenna 112. These frames are received by RN 120 through antenna 118. RN 120 sends these received frames to PDSN 130, where the IP packets are extracted from the received frames. After PDSN 130 extracts the IP packets from the data stream, PDSN 130 routes the IP packets to IP network 140. Conversely, PDSN 130 can send encapsulated frames through RN 120 to MS 110.

In the preferred embodiment, PDSN 130 is connected to a Remote Authentication Dial In User Service (RADIUS) server 150 for authenticating MS 110. PDSN 130 is also connected to Home Agent (HA) 160 for supporting the Mobile IP protocol. HA 160 includes entities capable of authenticating MS 110 and for granting it the use of an IP address when Mobile IP is to be used. One skilled in the art will recognize that RADIUS server 150 could be replaced with a DIAMETER server or any other AAA server without departing from the present invention.

In the preferred embodiment, MS 110 generates IP packets, and PDSN 130 connects to IP network 140. One skilled in the art will recognize that alternate embodiments could use formats and protocols other than IP without departing from the present invention. In addition, PDSN 130 may be connected to a network capable of protocols other than IP without departing from the present invention.

In the preferred embodiment, RN 120 and MS 110 communicate with each other using wireless spread spectrum techniques. In the preferred embodiment, the data is wirelessly transmitted using CDMA multiple access techniques, as described in aforementioned U.S. Pat. No. 4,901,307. One skilled in the art will recognize that the methods and techniques disclosed herein may be used in conjunction with several alternate modulation techniques, including TDMA, cdma2000, WCDMA, and EDGE.

In the preferred embodiment, MS 110 has the ability to perform Radio Link Protocol (RLP), Point-to-Point Protocol (PPP), Challenge Handshake Authentication Protocol (CHAP), and Mobile IP. In the preferred embodiment, RN 130 communicates with MS 110 using RLP. In the preferred embodiment, PDSN 130 supports PPP functionality, including Link Control Protocol (LCP), CHAP, and the PPP Internet Protocol Control Protocol (IPCP). In the preferred embodiment, PDSN 130, RADIUS server 150, HA 160 are physically located in different physical devices. In an alternate embodiment, one or more of these entities can be located in the same physical device.

Figure 2:
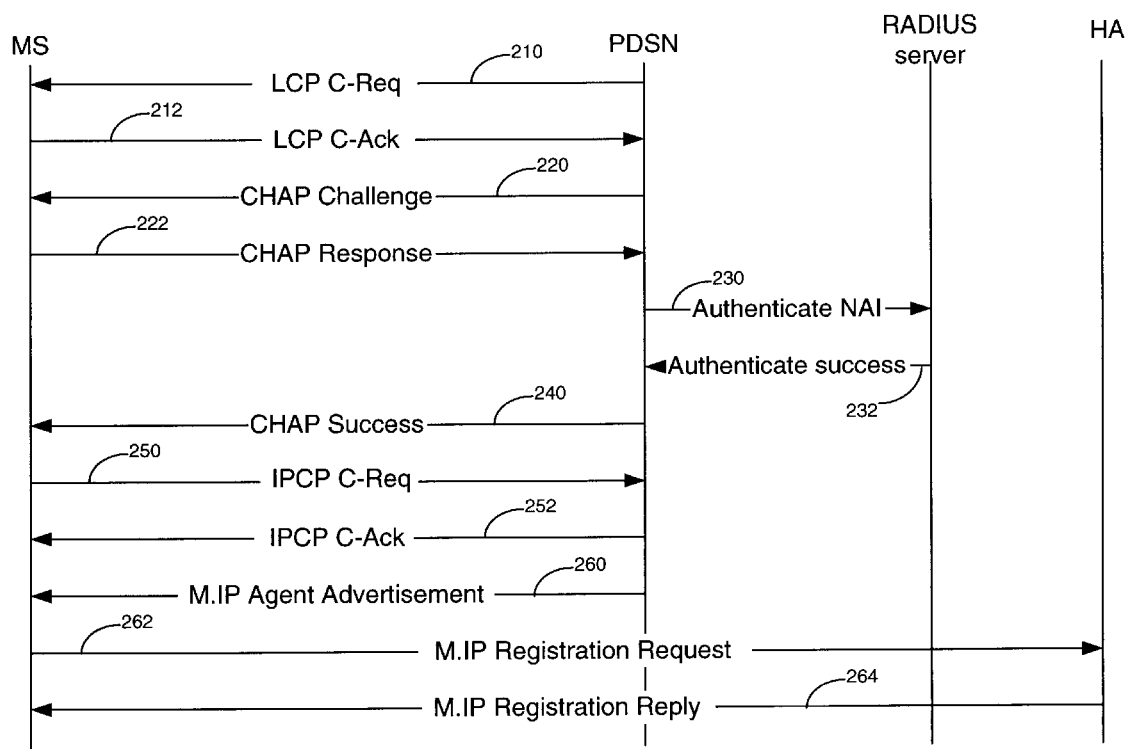
FIG. 2 is diagram of messages used to establish a packet data session using the Mobile IP protocol in accordance with a sub-optimal embodiment of the present invention.

FIG. 2 is diagram of messages used to establish a packet data session using the Mobile IP protocol in accordance with a sub-optimal embodiment of the present invention. In the sub-optimal embodiment, PDSN 130 exchanges valid CHAP messages with MS 110, and then forwards the CHAP response information to RADIUS server 150.

As illustrated, PDSN 130 sends a Link Control Protocol (LCP) Configure-Request (C-Req) 210 to MS 110, informing MS 110 of a subset of settings that it desires to use for the current PPP session. MS 110 responds by sending an LCP Configure-Acknowledgment (C-Ack) 212, to PDSN 130 specifying acceptance of the subset of settings suggested by PDSN 130. PPP LCP configure-request and LCP configure-ack messages are well known in the art and are described in detail in the aforementioned IETF RFC 1570.

For the purposes of authentication, PDSN 130 subsequently sends a CHAP challenge 220 to MS 110, to which MS 110 responds by sending a CHAP response 222 back to PDSN 130. One skilled in the art will recognize that additional messaging may take place between MS 110 and PDSN 130 without departing from the present invention. For example, multiple sets of LCP C-Req and LCP C-Ack messages may be exchanged as MS 110 and PDSN 130 negotiate a mutually agreeable set of PPP session settings. CHAP response 322 contains an identifier field, hereinafter referred to as a CHAP identifier, a name field, hereinafter referred to as a CHAP username, and a value field, hereinafter referred to as a CHAP response value. These fields are described in the aforementioned IETF RFC 1994, and are familiar to one skilled in the art. In the preferred embodiment, the received CHAP username represents a Network Access Identifier (NAI), as described in the aforementioned IETF RFC 2486.

After receiving CHAP response 222, PDSN 130 sends one or more messages to RADIUS server 150 to authenticate the CHAP username received in CHAP response 222. In an exemplary embodiment, PDSN 130 sends RADIUS server 150 an Authenticate Network Access Identifier (NAI) 230 containing the CHAP username and CHAP response value received in CHAP response 222. Authenticate NAI 230 is a request for RADIUS server 150 to authenticate the aforementioned CHAP username using the aforementioned CHAP response value. RADIUS server 150 responds by sending Authenticate success 232 to PDSN 130, indicating that the CHAP username and CHAP response value were successfully authenticated by RADIUS server 150. In the event that such authentication fails, RADIUS server 150 responds by sending an Authenticate failure (not shown) to PDSN 130.

After receiving an Authenticate success 232, PDSN 130 sends a CHAP success 240 to MS 110, indicating the success of authentication. The methods used by PDSN 130 in building a CHAP success based on a successful authentication by the authentication server is well known to those skilled in the art.

After receiving CHAP success 240, MS 110 sends an IPCP Configure-Request (C-Req) 250 to PDSN 130. PDSN 130 responds by sending an IPCP Configure-Ack (C-Ack) 252 to MS 110. In the exemplary embodiment, IPCP C-Req 250 and IPCP C-Ack 252 do not contain a request for an address assignment. Rather, the IPCP exchange contains a negotiation for one or more other IPCP options, such as Van Jacobson (VJ) header compression or a Domain Name Server (DNS) address. The IPCP messaging necessary to negotiate IPCP options is well known in the art. In the exemplary embodiment, Van Jacobson (VJ) header compression is negotiated. Following VJ header compression negotiation, PPP negotiations are complete, and it may be said that a valid PPP connection exists between MS 110 and PDSN 130.

In the exemplary embodiment, PDSN 130 has Mobile IP Foreign Agent capabilities and sends a Mobile IP (M.IP) Agent Advertisement 260 to MS 110. In the exemplary embodiment, MS 110 also supports the Mobile IP protocol and responds by transmitting a Mobile IP (M.IP) Registration Request 262. PDSN 130 forwards the M.IP Registration Request 262 to HA 160. In response, HA 160 transmits a Mobile IP (M.IP) Registration Reply 264. PDSN 130 forwards M.IP Registration Reply 264 to MS 110.

M.IP Registration Reply 264 indicates the success or failure of registration of MS 110 with HA 160. In the exemplary embodiment, registration is successful and M.IP Registration Reply 160 contains an IP address that HA 160 has assigned to MS 110. After MS 110 has been authenticated and has obtained a valid IP address via the receipt of M.IP Registration Reply 160, MS 110 can begin sending user data to IP Network 140. The Mobile IP messages necessary to successfully register a mobile station with Mobile IP home agent are well known in the art.

As is evident from the above scenario, two separate instances of authentication are performed. The first authentication instance, when RADIUS server 150 authenticates the NAI that originated from MS 110, occurs between the reception of CHAP response authentication 222 and the transmission of CHAP success 240. The second authentication instance occurs when HA 160 authenticates MS 110 after M.IP registration request 262 is transmitted to HA 160.

Having two sets of authentication for the same mobile station is wasteful. Authenticating twice causes extra messaging to be sent from PDSN 130 to IP Network 140, using up available bandwidth. Additionally, as the authentication process might be time consuming, MS 110 might be able to begin sending user data to IP Network 140 significantly quicker if one of the authentication instances could be removed. Processing these superfluous authentication messages wastes time and valuable computing and network resources.

Also, RADIUS server 150 and HA 160 may have a different measure for authentication. Consequently, the NAI associated with MS 110 may authenticate successfully with either RADIUS server 150 or HA 160, but not on both. If the NAI associated with MS 110 can authenticate successfully with only HA 160, the authentication failure with RADIUS server 150 may preclude any registration between MS 110 and HA 160. Such a problem could cause a session failure resulting in a call termination. In such an instance, it is desirable to perform authentication with only one server such that authentication will be successful.

Another advantage of the present invention involves the case wherein a laptop computer communicates through a wireless mobile station, and wherein the mobile station performs Mobile Node registration on behalf of the laptop. In this case, the first CHAP challenge goes to the laptop and the second Foreign Agent Challenge goes to the mobile. The user could have typed the wrong password and may not type the full NAI. So, if the PDSN uses the first CHAP challenge/response to authenticate, the authentication might fail and cause failure of the packet data session. However, the second authentication is done with the mobile and the mobile would have been pre-provisioned with the right NAI, password and home agent address. Such information would be stored in the phone, avoiding mismatches that could cause problems with the NAI and password.

Unfortunately, PDSN 130 must support a mixture of MS's that support either Mobile IP or CHAP authentication. A session in which CHAP authentication is performed and in which Mobile IP is not negotiated is referred to as "ordinary IP". In addition, MS's must support a mixture of PDSN's, not all of which support Mobile IP. As a result, most MS's begin negotiation by sending the more prevalent CHAP messages. A PDSN cannot detect whether an MS will use Mobile IP until a point in time that occurs after the exchange of CHAP Challenge 220, CHAP response 222, and CHAP success or failure messages have already taken place.

Although the above indicates the desirability of performing only one type of authentication, a PDSN cannot simply choose to solely rely on the Mobile IP registration performed at a home agent. The reason a PDSN cannot solely rely on Mobile IP home agent authentication is because a PDSN does not know whether a given mobile station desires to, or is even capable of, performing Mobile IP on any given call. It is for this reason that CHAP is used to authenticate a mobile station. A PDSN that supports Mobile IP cannot simply rely on CHAP authentication, because Mobile IP requirements require that Mobile IP authentication be performed for all connections in which Mobile IP will be used by a mobile station. What is desired is a way of only performing a single instance of authentication, while providing the proper type of authentication, regardless of whether or not a mobile station requests to perform Mobile IP.

Figure 3:
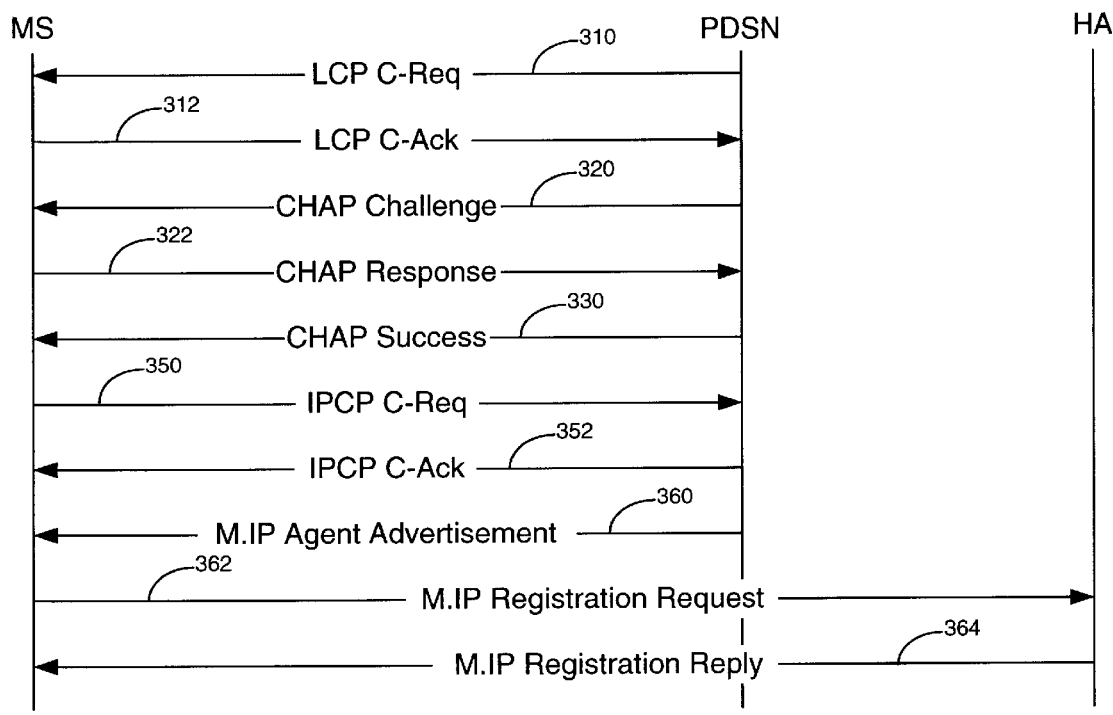
FIG. 3 is diagram of messages used to establish a Mobile IP protocol session wherein the Packet Data Serving Node (PDSN) sends an authentication success message to the mobile station prior to authenticating the mobile with an authentication server in accordance with an embodiment of the present invention.

FIG. 3 is diagram of messages used to establish a Mobile IP protocol session wherein the PDSN sends an authentication success message to the mobile station prior to authenticating the mobile with an authentication server in accordance with an embodiment of the present invention. In the exemplary embodiment, PDSN 130 avoids sending extraneous authentication messages to RADIUS server 150 by "spoofing" a CHAP success message and sending it to MS. Spoofing means generating and sending a message indicating that an action has been performed even though the action has not been performed The present invention provides a PDSN based solution for authenticating a mobile station wherein a mobile is authenticated only by an Authentication, Authorization, and Accounting (AAA) server when Mobile IP is not utilized. The present invention also provides a PDSN based solution in which a mobile station that desires Mobile IP is not authenticated by an authentication server prior to sending an IPCP Configuration Request indicating a choice between ordinary IP and Mobile IP. In the preferred embodiment of the present invention, the AAA server used to authenticate the mobile station in ordinary IP sessions is a RADIUS server.

As illustrated, PDSN 130 sends an LCP Configure-Request (C-Req) 310 to MS 110, informing MS 110 of a subset of settings that it desires to use for the current PPP session. MS 110 responds by sending an LCP Configure-Acknowledgment (C-Ack) 312, to PDSN 130 specifying acceptance of the subset of settings suggested by PDSN 130.

For the purposes of authentication, PDSN 130 subsequently sends a CHAP challenge 320 to MS 110, to which MS 110 responds by sending a CHAP response 322 back to PDSN 130. One skilled in the art will recognize that additional messaging may take place between MS 110 and PDSN 130 without departing from the present invention. CHAP response 322 contains a CHAP identifier, a CHAP username and a CHAP response value. In the preferred embodiment, the received CHAP username represents an NAI.

After receiving CHAP response 322, PDSN 130 sends CHAP success 330 to MS 110. Utilizing the present invention, PDSN 130 does not exchange authentication messages with an AAA server prior to transmitting CHAP success 330. Rather, when CHAP response 322 is received by PDSN 130, data from CHAP response 322, including the CHAP username and the CHAP response value, is buffered by PDSN 130. PDSN 130 uses the data from CHAP response 322 to form CHAP success 330 and send it to mobile station 110. CHAP success 330 indicates to mobile station 110 that authentication succeeded, even though no authentication actually took place. The information in CHAP response 322 is buffered for in case it is later determined that non-Mobile IP authentication is needed. In cases in which it is later determined that non-Mobile IP authentication is needed, PDSN 130 will later construct an Authenticate NAI 470 message (see FIG. 4), from the buffered data, and will send the message to RADIUS server 150.

After receiving CHAP success 330, MS 110 sends an IPCP Configure-Request (C-Req) 350 to PDSN 130. PDSN 130 responds by sending an IPCP Configure-Ack (C-Ack) 352 to MS 110. In the exemplary embodiment, IPCP C-Req 250 and IPCP C-Ack 352 contain Van Jacobson (VJ) header compression negotiation information well known in the art. Following VJ header compression negotiation, PPP negotiations are complete, and it may be said that a valid PPP connection exists between MS 110 and PDSN 130.

In the exemplary embodiment, PDSN 130 has Mobile IP Foreign Agent capabilities and sends a Mobile IP (M.IP) Agent Advertisement 360 to MS 110. In the exemplary embodiment, MS 110 also supports the Mobile IP protocol and responds by transmitting a Mobile IP (M.IP) Registration Request 362. PDSN 130 forwards the M.IP Registration Request 362 to HA 160. In response, HA 160 transmits a Mobile IP (M.IP) Registration Reply 364. PDSN 130 forwards M.IP Registration Reply 364 to MS 110.

M.IP Registration Reply 364 indicates the success or failure of registration of MS 110 with HA 160. In the exemplary embodiment, registration is successful, after which MS 110 has been authenticated, has obtained a valid IP address, and can begin sending user data to IP Network 140. The Mobile IP messages necessary to successfully register a mobile station with Mobile IP home agent are well known in the art.

As is evident from the above scenario, only one instance of authentication was performed. In particular, the PDSN only authenticated the mobile with via Mobile IP authentication when the present invention was employed in a situation in which MS 110 performed Mobile IP operations.

Figure 4:
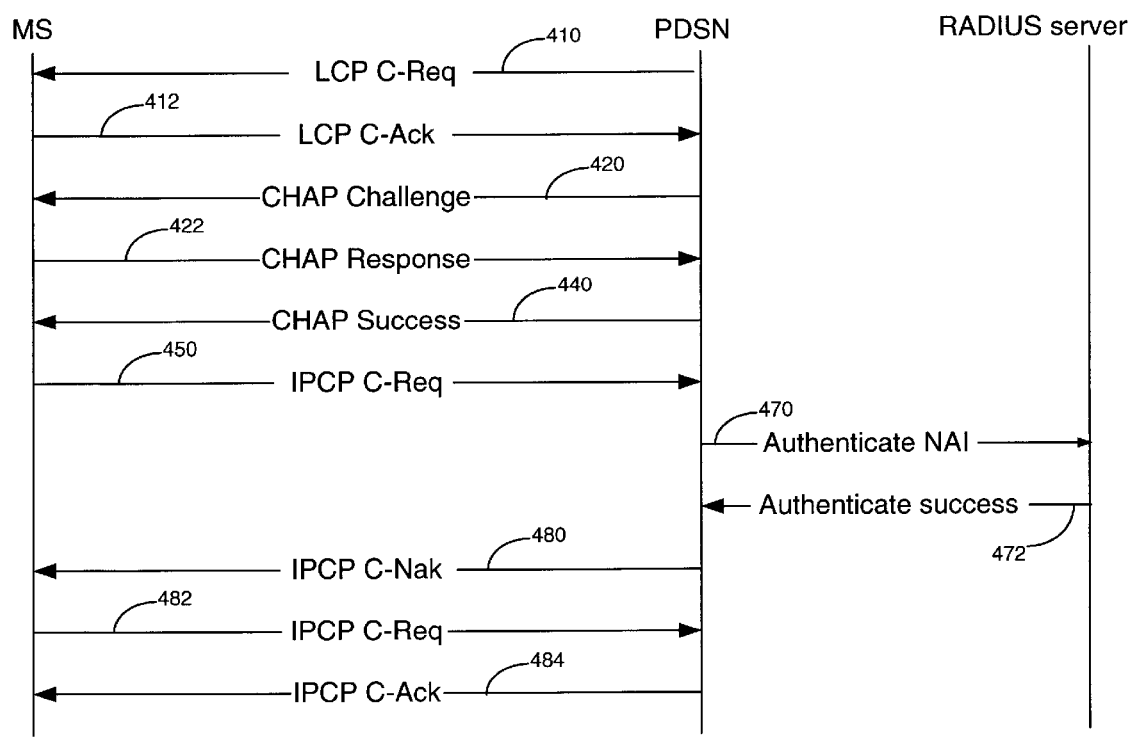
FIG. 4 is diagram of messages used to establish an IP protocol session wherein the PDSN sends an authenticate success message to the mobile station prior to authenticating the mobile with an authentication server in accordance with an embodiment of the present invention.

FIG. 4 is diagram of messages used to establish an IP protocol session wherein the PDSN sends an authenticate success message to the mobile station prior to authenticating the mobile with an authentication server in accordance with an embodiment of the present invention. In this scenario, the established session will be a "ordinary IP" session, wherein Mobile IP is not requested by the mobile station.

As illustrated, PDSN 130 sends an LCP Configure-Request (C-Req) 410 to MS 110, informing MS 110 of a subset of settings that it desires to use for the current PPP session. MS 110 responds by sending an LCP Configure-Acknowledgment (C-Ack) 412, to PDSN 130 specifying acceptance of the subset of settings suggested by PDSN 130.

For the purposes of authentication, PDSN 130 subsequently sends a CHAP challenge 420 to MS 110, to which MS 110 responds by sending a CHAP response 422 back to PDSN 130. One skilled in the art will recognize that additional messaging may take place between MS 110 and PDSN 130 without departing from the present invention. CHAP response 422 contains a CHAP identifier, a CHAP username and a CHAP response value. In the preferred embodiment, the received CHAP username represents an NAI.

After receiving CHAP response 422, PDSN 130 sends CHAP success 440 to MS 110. Utilizing the present invention, PDSN 130 does not wait for an authentication success message from an AAA server prior to transmitting CHAP success 440. In contrast to the scenario depicted in FIG. 2, using the present invention PDSN 130 sends CHAP success 440 without waiting for authentication verification from an AAA server. As depicted in FIG. 4, in the preferred embodiment of the invention not only does PDSN 130 not wait for authentication verification prior to transmitting CHAP success 440, but PDSN 130 also does not transmit any authentication requests to an AAA server prior to transmitting CHAP success 440. Rather, when CHAP response 422 is received by PDSN 130, data from CHAP response 422, including the CHAP username and the CHAP response value, is buffered by PDSN 130. The information is buffered for cases in which it is later determined that non-Mobile IP authentication is needed. As depicted, prior to PDSN 130 determining whether or not MS 110 will successfully authenticate, PDSN 130 transmits a CHAP success 440 to MS 110.

After receiving CHAP success 440, MS 110 sends an IPCP Configure-Request (C-Req) 450 to PDSN 130. Because MS 110 will not be requesting Mobile IP in this scenario, IPCP C-Req 450 will contain a request for a dynamic IP address. The preferred embodiment of the present invention uses an IPCP request for a dynamic IP address to determine that Mobile IP will not be requested a mobile station later in a session. When a PDSN has made the determination that Mobile IP will not later be requested by a mobile station, the present invention attempts to authenticate the mobile station by contacting an AAA server, a RADIUS server in the preferred embodiment.

Thus, as illustrated in FIG. 4, in response to PDSN 130 receiving IPCP C-Req 450 containing a request for a dynamic IP address, PDSN 130 sends RADIUS server 150 an Authenticate NAI 470 containing the CHAP username and CHAP response value received in CHAP response 422. Authenticate NAI 230 is a request for RADIUS server 150 to authenticate the aforementioned CHAP username using the aforementioned CHAP response value. RADIUS server 150 responds by sending Authenticate success 472 to PDSN 130, indicating that the CHAP username and CHAP response value were successfully authenticated by RADIUS server 150. In the event that such authentication fails, RADIUS server 150 responds by sending an Authenticate failure (not shown) to PDSN 130.

At this point, PDSN 130 is able to determine that MS 110 was successfully authenticated. Thus, PDSN proceeds with the IPCP protocol. It should be noted that in a scenario in which authentication with RADIUS server 150 should fail, PDSN 130 could either re-initiate a CHAP challenge to MS 110, or it could simply instruct RN 120 to terminate its connection with MS 110.

However, since FIG. 4 is representative of a successful authentication scenario, the next message transmitted by PDSN 130 is IPCP Configure-Nak (C-Nak) 480. IPCP C-Nak 480 contains an IP address available for use by MS 110. In response to receiving IPCP C-Nak 480, MS 110 sends IPCP Config-Req (C-Req) 482 to PDSN 130, requesting that the aforementioned IP address be assigned to MS 110. After that, PDSN 130 transmits an IPCP Configure-Ack (C-Ack) 484 to MS 110, informing MS 110 that the aforementioned IP address has been assigned to MS 110 for the duration of the PPP session. Van Jacobson header compression may have been negotiated during IPCP negotiation as well. One skilled in the art would be familiar with the IPCP messages necessary to negotiate an IP address and optionally Van Jacobson header compression. At this point, PPP negotiations are complete, and it may be said that a valid PPP connection exists between MS 110 and PDSN 130. As MS 110 will not be requesting a Mobile IP session in this scenario, and because at this point MS 110 has been authenticated and MS 110 has obtained a valid IP address, MS 110 can begin sending user data to IP Network 140.

As is evident from the above scenario, in which MS 110 did not perform Mobile IP operations, exactly one instance of authentication was performed.

As was depicted both in FIG. 3, a scenario in which the mobile desired to use Mobile IP, and in FIG. 4, a scenario in which the mobile desired to use ordinary IP, the present invention addresses the problem of superfluous authentication message exchanges.

Figure 5:
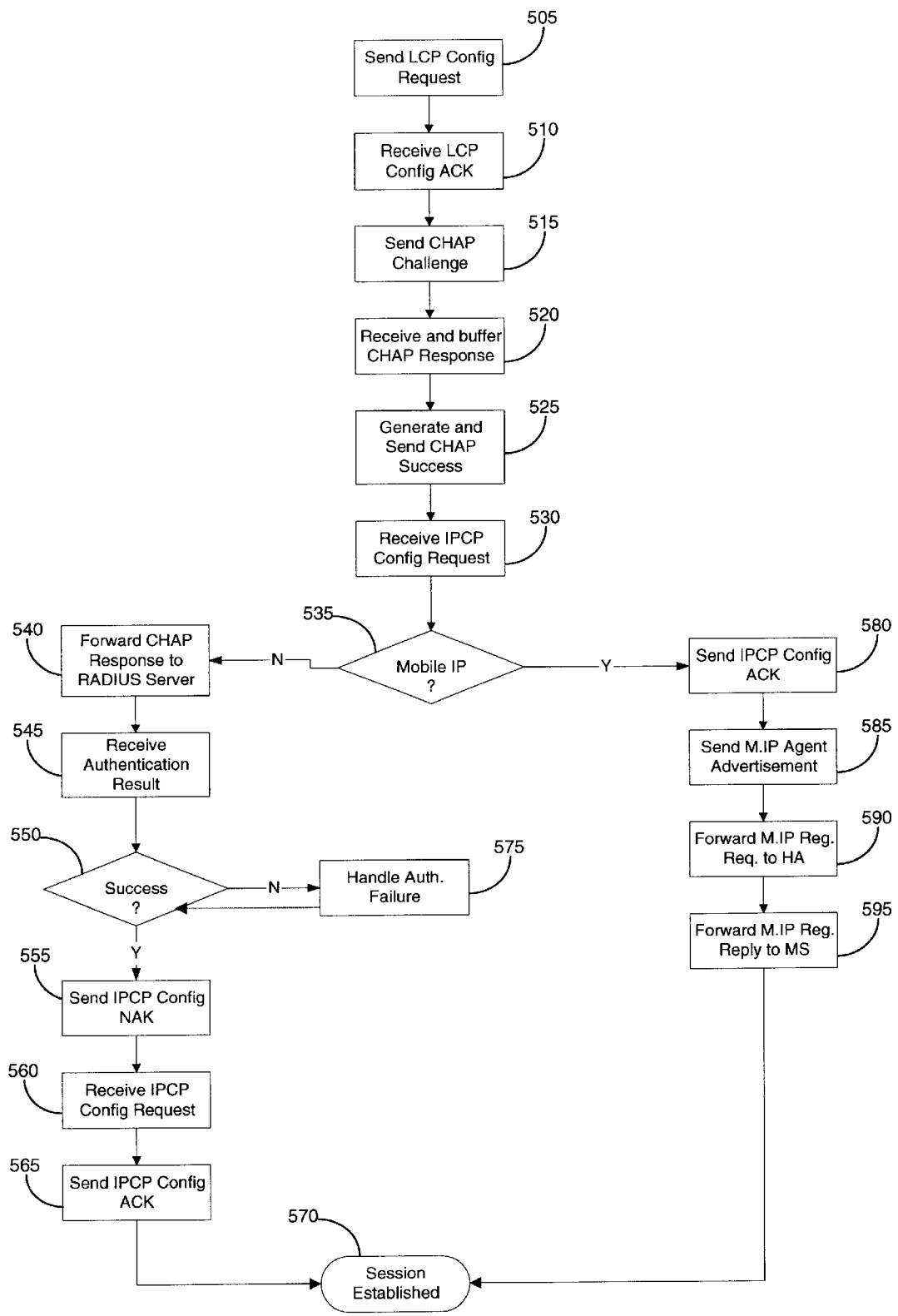
FIG. 5 is a flowchart of a method used by a PDSN to establish a packet data session in accordance with an embodiment of the present invention.

FIG. 5 is a flowchart of a method used by a PDSN to establish a packet data session in accordance with an embodiment of the present invention. In block 505, the PDSN sends a PPP LCP Configure-Request to a mobile station. The PPP LCP Configure-Request contains a subset of settings that the PDSN desires to use for the current PPP session. The process then moves to block 510. In block 510, the PDSN receives a PPP LCP Configure-Ack message from the mobile station, indicating that the mobile station has agreed to use a particular subset of settings suggested by the PDSN.

The process then moves to block 515. In block 515, the PDSN sends a PPP CHAP challenge message to the mobile station to initiate an authentication sequence. The process then moves to block 520. In block 520, the PDSN receives a PPP CHAP response message from the mobile station. The PPP CHAP response message comprises a CHAP identifier, a CHAP username, and a CHAP response value. In block 520, the PDSN buffers the CHAP username and the CHAP response value. In the preferred embodiment, the PDSN also buffers the CHAP identifier. The process then moves to block 525.

In block 525, the PDSN generates a PPP CHAP success message and sends the message to the mobile station. The PDSN simply generates a CHAP success message with the CHAP identifier received in block 520. The CHAP success message is sent by the PDSN without the PDSN having an authentication successfully authenticated the CHAP username associated with the mobile station. This could be termed "spoofing" a CHAP success, since a CHAP success is normally only generated once an authentication server, such as a RADIUS server, successfully authenticates the CHAP username. The process then moves to block 530.

In block 530, the PDSN receives a PPP IPCP Configure-Request from the mobile station. The PPP IPCP Configure-Request may contain a request to use Van Jacobson header compression during the PPP session. Additionally, the PPP IPCP Configure-Request may contain a request for IP address assignment for the mobile station. The IPCP protocol is well known to those skilled in the art. The process then moves to block 535.

In block 535, the PDSN determines whether the mobile station desires to perform the Mobile IP protocol during the current PPP session. In the preferred embodiment, the PDSN makes this determination by checking whether the IPCP Configure-Request received in block 530 contains a request for an IP address of "0.0.0.0," which is an indication that the mobile station does not desire Mobile IP during this session. In the preferred embodiment, if an IPCP Configure-Request that contains a request for an IP address assignment of "0.0.0.0" is not received, it is an indication that the mobile station desires Mobile IP during this session.

In a first alternative embodiment, the PDSN makes this determination by checking whether the IPCP Configure-Request received in block 530 contains a request for any IP address. In this first alternative embodiment, a request for any IP address assignment in the IPCP Configure-Request message causes the PDSN to determine that Mobile IP is not desired by the mobile station during this session. In a second alternative embodiment the PDSN inspects the CHAP username received in block 520 to for any unique fields, such as a domain name. If the CHAP username contains an identifying trait, such as a particular domain name, that indicates whether the mobile station either desires to use Mobile IP during this PPP session, then the determination is made accordingly.

If it is determined that the Mobile Station does not desire to perform the Mobile IP protocol during the current PPP session, the process moves from block 535 to block 540. In block 540, the PDSN sends one or more messages to a RADIUS server to authenticate the mobile, wherein the messages comprise the CHAP usemame and CHAP response value buffered in block 520. One skilled in the art will recognize that the PDSN could send authentication messages to a different type of AAA server than a RADIUS server without departing from the present invention. In an alternate embodiment, in block 540, the PDSN could exchange authentication messages with a DIAMETER server. The process then proceeds to block 545. In block 545 the PDSN receives an authentication result from the RADIUS server. The process then moves to block 550.

In block 550, the authentication result is examined to determine whether the AAA server generated an authentication success indication. In the event that the AAA server generated an authentication success indication, the process moves to block 555. In block 555, the PDSN sends a PPP IPCP Configure-Nak to the mobile station. The PPP IPCP Configure-Nak contains an IP address available for the mobile station to use as its own. The process then moves to block 560. In block 560, another PPP IPCP Configure-Request is received. This IPCP Configure-Request contains a request to assign the aforementioned available IP address to the mobile station. The process then moves to block 565. In block 565, the PDSN sends a PPP IPCP Configure-Ack to the mobile station, informing the mobile station that the aforementioned IP address has been assigned to it. The process then moves to block 570. In block 570, the PPP session has been established. The mobile station has been authenticated, has been assigned an IP address for use during the current session, and may now send user data packets to an IP network to which the PDSN is attached.

Returning to block 550, if it is determined that the AAA server did not generate an authentication success indication, the process moves to block 575. In block 575, the PDSN handles the authentication failure. In an exemplary embodiment, the PDSN tells the wireless radio network to which it is attached to terminate the connection with the mobile station. In this embodiment, the PDSN deallocates all resources associated with the current PPP session.

In an alternate embodiment, handling authentication failure 575 comprises sending another PPP CHAP challenge message to the mobile station, and using the associated PPP CHAP challenge response to authenticate the mobile station with the AAA server. Upon the success of such a subsequent authentication attempt, processing proceeds to block 550, where the success of the latest authentication is examined.

Returning to block 535, if it is determined that the mobile station desires to perform the Mobile IP protocol during the current PPP session, the process moves to block 580. In block 580, the PDSN sends a PPP IPCP Configure-Ack to the mobile station, indicating to the mobile station that the IPCP options suggested by the mobile station were accepted by the PDSN. At this point, PPP negotiations are complete. The process then moves to block 585.

In block 585, the PDSN, functioning as a Mobile IP foreign agent, sends a Mobile IP agent advertisement to the mobile station in accordance with the guidelines for a Mobile IP foreign agent. Such guidelines are known to those skilled in the art.

In block 590, the PDSN receives a Mobile IP registration request message. The registration request is forwarded to the Mobile IP home agent contained in the Mobile IP registration request message.

In the preferred embodiment, the received Mobile IP registration request contains an NAI Extension, MS-RADIUS Extension (i.e. challenge response), Foreign Agent Challenge Extension, and a MS-HA Authentication Extension. The MIP Registration Request is carried in an IP packet with source address 0.0.0.0. In the preferred embodiment, the PDSN constructs a RADIUS Access-Request based on the NAI Extension, mobile station-RADIUS Extension, and Foreign Agent Challenge Extension. The Access Request is forwarded to the Home RADIUS Server for authentication. If the mobile station is authenticated successfully, the home RADIUS Server returns an Access-Accept. If an Access-Accept is not received, the PDSN tells the wireless radio network to which it is attached to terminate the connection with the mobile station. Conversely, if an Access-Accept is received, the PDSN forwards the Mobile IP registration request to the home agent after a secure tunnel is established between the PDSN and the home agent. The process then moves to block 595.

In block 595, after the home agent successfully authenticates the mobile station, the PDSN receives a Mobile IP registration reply that contains an address to be assigned to the mobile station. In the preferred embodiment, the PDSN updates any local databases that need to keep track of the address assigned to the mobile station, and then the PDSN forwards the Mobile IP registration reply onto the mobile station. Mobile IP authentication and registration techniques are well known to those skilled in the art, and are described in RFCs 2002, 2006, 2041, 2290, 2344, and 2356.

Figure 6:
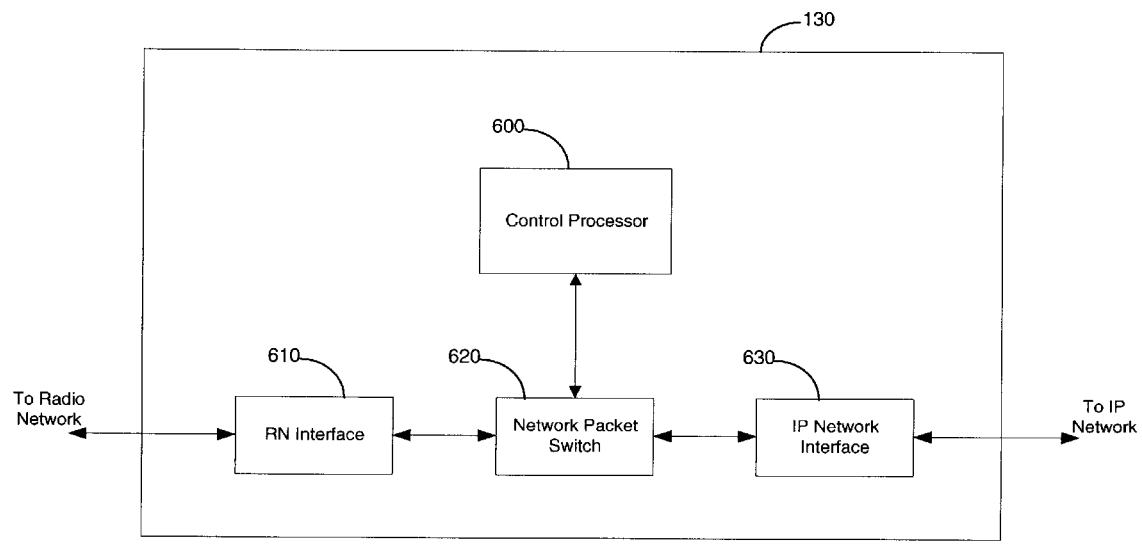
FIG. 6 is a diagram of an embodiment of a Packet Data Serving Node (PDSM).

FIG. 6 is a high-level block diagram of an exemplary embodiment of a Packet Data Serving Node (PDSN). Radio Network (RN) Interface 610 receives data packets from Radio Network (RN) 120. RN Interface 610 receives these packets over a physical interface. In the preferred embodiment, the physical interface is T3, a standard digital telecommunications interface that has a 45 Mbps transfer rate. The physical T3 interface could be replaced with a T1 interface, Ethernet interface, or any other physical interface used for data networking without departing from the present invention.

RN interface 610 delivers the received packets to Network Packet Switch 620. In the exemplary embodiment, the connection between network packet switch 620 and RN interface 610 is comprised of a memory bus connection. The connection between RN interface 610 and network packet switch 620 could be Ethernet or any other of a variety of communications link well known in the art without departing from the present invention. RN interface 610 is also capable of receiving packets from network packet switch 620 over the same connection and transmitting them to RN 120.

Network packet switch 620 is a configurable switch that is capable of routing packets between a variety of interfaces. In the preferred embodiment, Network Packet Switch 620 is configured such that all packets received from RN interface 610 and IP network interface 630 are routed to control processor 600. In an alternative embodiment, network packet switch 620 is configured such that a subset of received frames from RN interface 610 are delivered to IP network 630, and a remaining subset of received frames from RN interface 610 are delivered to control processor 600. In the preferred embodiment network packet switch 620 delivers packets to control processor 600 via a shared memory bus connection. The connection between RN interface 610 and network packet switch 620 could be Ethernet or any other of a variety of well known types of communications link without departing from the present invention. Though network packet switch is connected to RN interface 610 and IP network interface 630, one skilled in the art will appreciate that network packet switch 620 could be connected to a smaller or larger number of interfaces. In an embodiment in which network packet switch is connected to a single network interface, that network interface will connect both to IP network 140 and to RN 120. In an alternative embodiment, network packet switch 610 is incorporated into control processor 600. In other words, in the alternative embodiment, control processor 600 communicates directly with the network interface(s).

Control processor 600 exchanges information packets with RN interface 610 when a connection with a mobile station is desired. After control processor 600 receives an information packet indicating that a connection with a mobile station is desired, control processor 600 negotiates a PPP session with the mobile station. To negotiate the PPP session, control processor 600 generates PPP frames and sends them to RN interface 610, and interpreting responses from the mobile station received from RN interface 610. The types of frames generated by control processor 600 include LCP, IPCP, and CHAP frames. In the preferred embodiment, control processor 600 buffers a received CHAP response and sends a CHAP success message to a mobile station prior to authenticating a mobile station. Additionally, control processor 600 determines, based upon the contents of an IPCP message received subsequent to the CHAP response message, whether an authentication request should be made using the aforementioned buffered information. In the preferred embodiment of the present invention, control processor 600 performs the duties of a Mobile IP foreign agent.

Control processor 600 generates packets for exchange with AAA servers and Mobile IP home agents. Additionally, for each established PPP session, control Processor 600 encapsulates and unencapsulates IP packets. One skilled in the art will recognize that control processor 600 may be implemented using field-programmable gate arrays (FPGA), programmable logic devices PLD), digital signal processors (DSP), one or more microprocessors, application specific integrated circuit (ASIC) or other device capable of performing the PDSN functions described above.

In the preferred embodiment of the present invention, these packets are delivered to network packet switch 620, which in turn delivers them to IP network interface 630 for delivery to IP network 140. IP Network Interface 630 transmits these packets over a physical interface. In the preferred embodiment, the physical interface is T3, a standard digital telecommunications interface that has a 45 Mbps transfer rate. The physical T3 interface could be replaced with a T1 interface, Ethernet interface, or any other physical interface used for data networking without departing from the present invention. IP network interface 630 is also capable of receiving packets over the same physical interface.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of establishing a communication link with a remote station comprising the steps of:

generating an authentication challenge message;

sending said authentication challenge message to the remote station;

receiving an authentication challenge response message from the remote station, wherein said authentication challenge response message corresponds to said authentication challenge message;

spoofing an authentication success message based on said challenge response message;

sending said authentication success message to the remote station;

receiving a second message from the remote station; and sending an authentication request message to an authentication server based on said second message.

2. The method of claim 1 further comprising the step of storing information from said authentication challenge response message in a buffer, wherein said authentication request message is based on the contents of said buffer.

3. The method of claim 1 wherein said authentication request message is based on said authentication challenge response message.

4. The method of claim 3 wherein said authentication server is a Remote Authentication Dial In User Service (RADIUS) server.

5. The method of claim 3 wherein said authentication server is a home agent server.

6. The method of claim 5 wherein said home agent server is a Mobile Internet Protocol (IP) server.

7. The method of claim 1 further comprising the steps of:

receiving from said authentication server an authentication response message corresponding to said authentication request message, and indicating authentication failure of the remote station; and terminating transmissions to the remote station based on said authentication response message.

8. The method of claim 1 further comprising the steps of:

receiving from said authentication server an authentication response message corresponding to said authentication request message, and indicating authentication failure of the remote station; and sending a second authentication challenge message to the remote station based on said authentication response message.

9. The method of claim 1 further comprising the steps of:

receiving from said authentication server an authentication response message corresponding to said authentication request message; and sending a message containing a network address to the remote station.

10. The method of claim 9 wherein said authentication server is a Remote Authentication Dial In User Service (RADIUS) server.

11. The method of claim 9 further comprising the step of generating said network address.

12. The method of claim 9 wherein said authentication response message is a Mobile IP Registration Reply.

13. The method of claim 9 wherein said authentication response message is an Internet Protocol Control Protocol (IPCP) Registration Reply message.

14. The method of claim 9 wherein said authentication response message is a message from the subset of RADIUS protocol messages comprising the Access-Accept message and the Access-Reject message.

15. The method of claim 1 wherein said authentication challenge message is a Challenge Handshake Authentication Protocol (CHAP) Challenge message, said authentication challenge response message is a CHAP Response Message, and said authentication success message is a CHAP Success Message.

16. The method of claim 15 wherein said authentication challenge response message comprises a Challenge Handshake Authentication Protocol (CHAP) username, and wherein said authentication request message comprises said CHAP username.

17. The method of claim 15 wherein said authentication challenge response message comprises a Challenge Handshake Authentication Protocol (CHAP) identifier (ID), and wherein said authentication request message comprises said CHAP ID.

18. The method of claim 15 wherein said authentication challenge response message comprises a Challenge Handshake Authentication Protocol (CHAP) response value, and wherein said authentication request message comprises said CHAP response value.

19. A packet data serving node (PDSN) for communicating with a wireless telecommunications serving network, the PDSN comprising:
   a control processor for:
      generating an authentication challenge message;
      sending said authentication challenge message to a remote station;
      receiving an authentication challenge response message from the remote station, wherein said authentication challenge response message corresponds to said authentication challenge message;
      spoofing an authentication success message based on said challenge response message;
      sending said authentication success message to the remote station;
      receiving a second message from the remote station; and
      sending an authentication request message to an authentication server based on said second message.

20. The PDSN of claim 19 wherein said control processor is further for storing information from said authentication challenge response message, wherein said authentication request message is based on the stored authentication challenge response message information.

21. The PDSN of claim 20 wherein said control processor is further for
   receiving from said authentication server an authentication response message corresponding to said authentication request message, and indicating authentication failure of the remote station; and
   sending one or more messages to the wireless telecommunications serving network to indicate that the wireless telecommunications system should terminate the packet data connection with the remote station.

22. The PDSN of claim 21 wherein said control processor is further for:
   receiving from said authentication server an authentication response message corresponding to said authentication request message, and indicating authentication failure of the remote station, and
   sending a second authentication challenge message to the remote station based on said authentication response message.

23. The PDSN of claim 22 wherein said control processor is further for
   receiving from said authentication server an authentication response message corresponding to said authentication request message, and
   sending a message containing a network address to the remote station.

24. The PDSN of claim 23 further comprising:
   an interface for generating signals for communicating with a radio network; and
   an interface for generating signals for communicating with an Internet Protocol (IP) network.

25. The PDSN of claim 24 further comprising a network packet switch for routing packets between a variety of interfaces.

26. The PDSN of claim 24 wherein said control processor is further for routing packets between a variety of interfaces.

27. The PDSN of claim 23 further comprising a single interface for generating signals to communicate with a radio network and for generating signals for communicating with an Internet Protocol (IP) network.

28. The PDSN of claim 27 further comprising a network packet switch for routing packets between a variety of interfaces.

29. The PDSN of claim 27 wherein said control processor is further for routing packets between a variety of interfaces.

30. A wireless packet data communication system comprising:
   a wireless telecommunications serving network for communicating wirelessly with a remote station; and
   a serving node (PDSN) for communicating with said wireless telecommunications serving network, the PDSN further comprising a control processor for:
      generating an authentication challenge message;
      sending said authentication challenge message to a remote station;
      receiving an authentication challenge response message from the remote station, wherein said authentication challenge response message corresponds to said authentication challenge message;
      spoofing an authentication success message based on said challenge response message;
      sending said authentication success message to the remote station;
      receiving a second message from the remote station; and
      sending an authentication request message to an authentication server based on said second message.

31. The PDSN of claim 30 wherein the wireless telecommunications serving network is a CDMA wireless network.

32. The PDSN of claim 30 wherein the wireless telecommunications serving network is a cdma2000 wireless network.

33. A method of establishing a communication link with a remote station comprising the steps of:
   sending an authentication challenge message to the remote station;
   receiving an authentication challenge response message from the remote station, wherein said authentication challenge response message corresponds to said authentication challenge message;
   sending, to the remote station, an authentication success message after receiving the authentication challenge response message without waiting for authentication verification;
   receiving a second message from the remote station; and
   sending an authentication request message to an authentication server based on said second message.

* * * * *